United States Patent [19]

Kirchhofer

[11] 4,216,742
[45] Aug. 12, 1980

[54] MULTI-TIERED CAGE AND FEED DEVICE

[75] Inventor: James E. Kirchhofer, Luverne, Minn.

[73] Assignee: A. R. Wood Manufacturing Company, Luverne, Minn.

[21] Appl. No.: 910,684

[22] Filed: Jun. 15, 1978

[51] Int. Cl.² ............................................. A10K 39/00
[52] U.S. Cl. ................................. 119/18; 119/52 AF; 119/53
[58] Field of Search ............ 119/18, 52 AF, 53, 51 R

[56] References Cited

U.S. PATENT DOCUMENTS

| | | | |
|---|---|---|---|
| 2,066,264 | 12/1936 | Fisher | 119/53 |
| 3,319,606 | 5/1967 | Virgil | 119/51 R |
| 3,388,690 | 6/1968 | Hostetler | 119/53 |
| 3,585,970 | 6/1971 | Scott | 119/53 |
| 3,888,211 | 6/1975 | Allen | 119/18 |

*Primary Examiner*—Hugh R. Chamblee
*Attorney, Agent, or Firm*—Merchant, Gould, Smith, Edell, Welter & Schmidt

[57] ABSTRACT

A multi-tiered feed device for animals including generally vertically spaced first and second feed stations. Each of the feed stations includes a pan and a top enclosure secured to the pan. A first feed conduit supplied with animal feed is provided and extends into the first feed station and is positioned over and above an aperture in the bottom of the pan. A second feed conduit is also provided which is positioned beneath the aperture and extends into the second feed station above the bottom of the pan and is connected to the first feed station. The feed stations are each mounted on their respective feed conduits. A multi-tiered cage completely surrounding the first and second feed stations is also provided which is divided into an upper and lower tier.

22 Claims, 6 Drawing Figures

MULTI-TIERED CAGE AND FEED DEVICE

FIELD OF THE INVENTION

This invention relates to animal husbandry, in particular, a multi-tiered feed device for chicks. This invention further relates to a multi-tiered cage for use in combination with the multi-tiered feed device.

BACKGROUND OF THE INVENTION

The economical raising of a large quantity of animals, such as chickens, requires that maximum utilization be made of the space available. Normal operations usually only employ the horizontal dimension of the space, e.g., the floor of the barn. Utilization of the vertical component can be extremely important, especially where the available raising space is limited. Some sort of multi-tiered device for utilizing the vertical component of the raising space is therefore desirable, especially for raising young animals such as chicks. A multi-tiered device is also preferable when it is necessary to separate various types of animals while making maximum utilization of limited raising space.

When employing a multi-tiered device for raising animals, it is also necessary to devise a suitable multi-tiered feed device. This device is preferably constructed so that it can be easily cleaned or installed for the particular application required. Such devices also preferably include some form of feed control mechanism to prevent the animal feed from becoming stale prior to its being consumed by the animal.

SUMMARY OF THE INVENTION

Applicant has invented a new and useful multi-tiered feed device for animals for use in combination with a multi-tiered cage.

The feed device, according to the present invention, includes an upper first feed station and a lower second feed station spaced generally vertically from the first feed station. Each of the feed stations includes a pan having a bottom and sidewall extending upwardly from the bottom, and a top enclosure secured to the sidewall and being configured for access of the animals to the interior of the pan. The feed device further comprises means for supplying feed to the feed stations including a first feed conduit having a feed inlet and a feed outlet extending into the first feed station and being positioned over and above an aperture in the bottom of the pan of the first feed station, the first feed station being mounted on the first feed conduit. A second feed conduit is also provided and has a feed inlet positioned beneath the aperture and a feed outlet extending into the second feed station and positioned above the bottom of the pan of the second feed station, the second feed station being mounted on the second feed conduit. The feed device further includes means for connecting the second feed conduit to the first feed station. Means can also be provided for mounting the first feed conduit to an overhead feed line, as well as means for adjusting the quantity of feed supplied to at least one of the feed stations.

The multi-tiered feed device, according to the present invention, insures that an adequate quantity of feed is supplied to each of the feed stations, yet prevents the feed from becoming stale prior to consumption. Also, applicant's feed device is easily disassembled for cleaning and installation purposes so that the cost and time of labor are minimized.

The multi-tiered feed device, according to the present invention, is used in combination with a multi-tiered cage. The multi-tiered cage includes a cage completely surrounding the first and second feed stations and is configured to prevent the escape of animals therefrom. The multi-tiered cage further includes means positioned below the first feed station and above the second feed station for dividing the cage into an upper and a lower tier. The multi-tiered cage, according to the present invention, insures a maximum utilization of raising space, especially where it is desired to raise two different types or breeds of animals which must be kept separate.

DETAILED DESCRIPTION OF THE PREFERRED EMBODIMENT OF THE INVENTION

Figure 1:
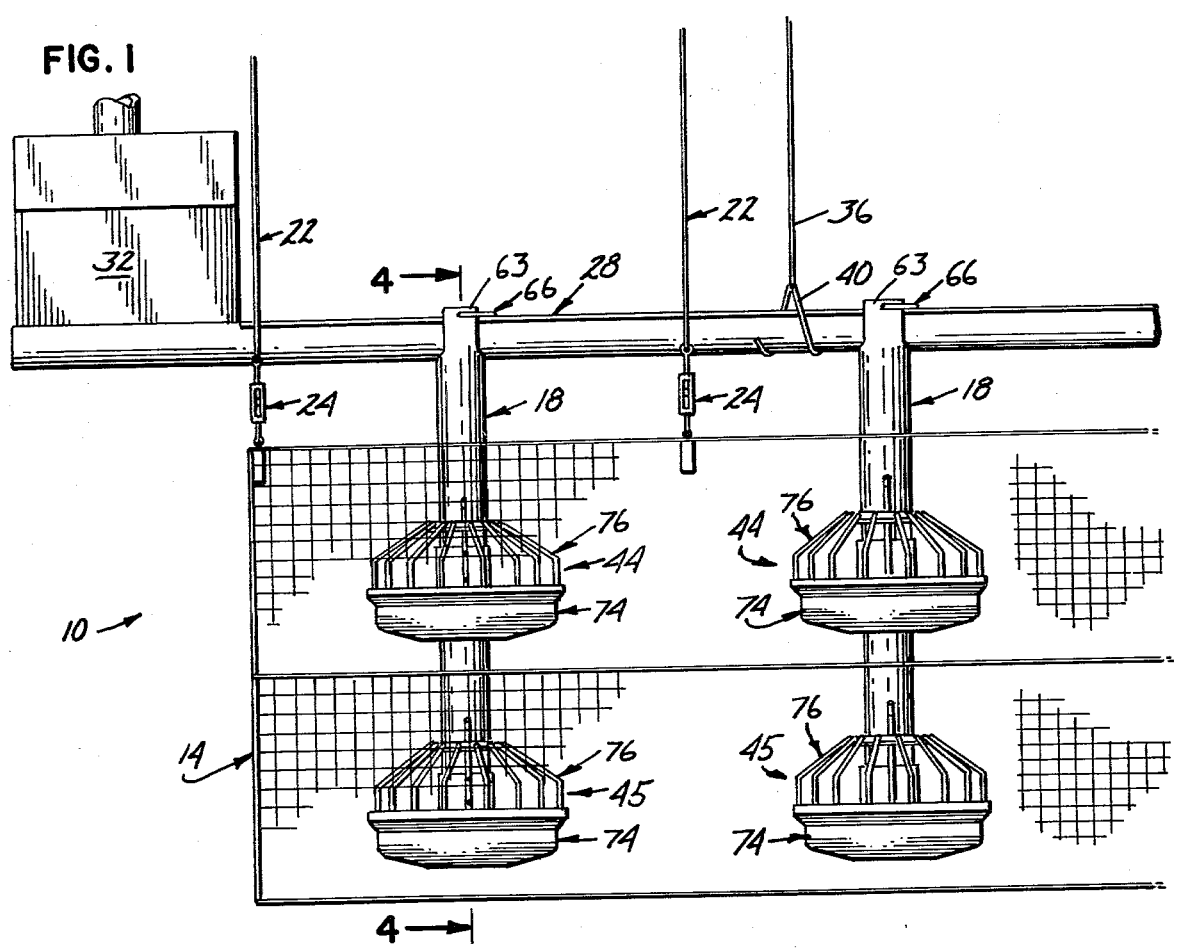
FIG. 1 is a side elevational view of a multi-tiered cage and feed device according to the present invention.

Referring to the drawings, FIG. 1 shows a multi-tiered cage and feed device according to the present invention which is generally designated by the numeral 10. Device 10 can be employed for various purposes, such as the raising of small animals, e.g., chicks.

Device 10 includes a multi-tiered cage 14 and a multi-tiered feed device or devices 18. Two such feed devices 18 are shown in FIG. 1. Cage 14 is supported by suitable means from the ceiling of the barn or other similar structure, such as by overhead vertical wires 22, which are secured to the cage by suitable connectors, such as eyebolt-hook combinations 24. Feed devices 18 are secured to overhead feed line 28. Feed line 28 is a tube which supplies animal feed from feed storage bin 32 to feed devices 18 by means of a core auger, not shown, which rotates within the overhead feed line. The overhead feed line is supported by suitable means, such as overhead wire or wires 36 and hook or hooks 40.

Figure 4:
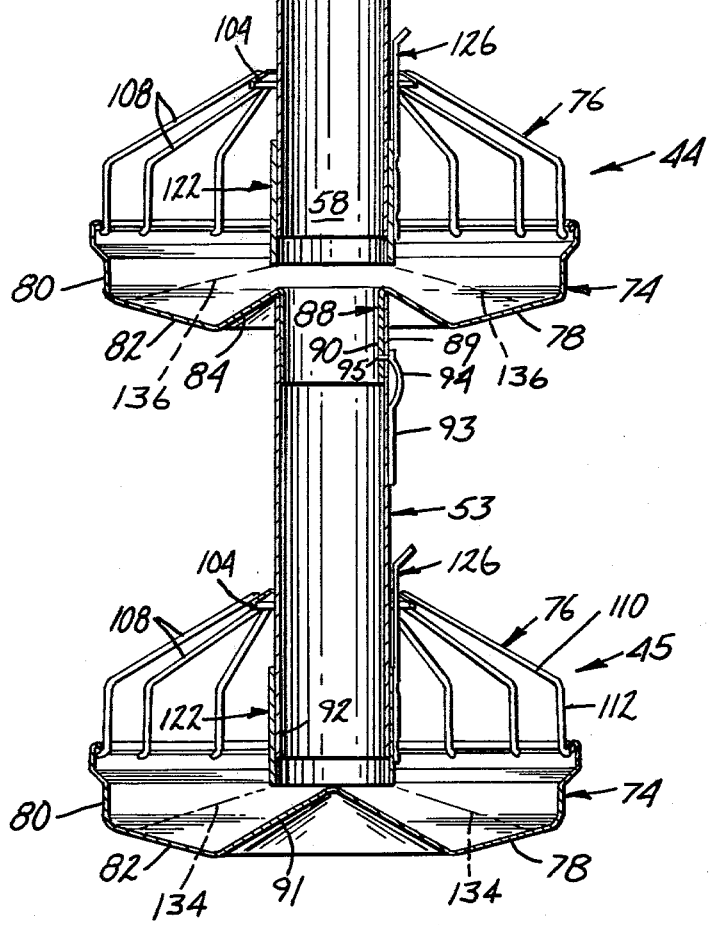
FIG. 4 is an enlarged sectional view taken generally along line 4—4 of FIG. 1.

Referring now to FIG. 4, feed device 18 includes a pair of generally vertically spaced animal feed stations, such as upper or first feed station 44 and lower or second feed station 45. Device 18 further includes generally cylindrical first and second feed conduits 52 and 53, the feed stations being mounted on the conduits. Feed conduit 52 has a feed inlet 56 and a feed outlet, generally indicated by the numeral 58, which extends into the first feed station 44. Feed inlet 56 is preferably configured to the shape of the overhead feed line for insertion onto it, e.g., is generally U-shaped as shown in FIG. 4. Feed inlet 56 further includes a pair of spaced ears 62 and 63 which extend above the overhead feed line.

Figure 2:
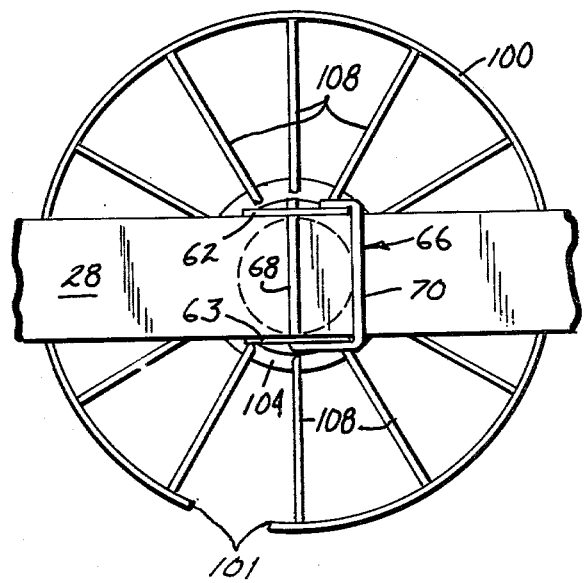
FIG. 2 is an enlarged top plan view of a multi-tiered feed device according to the present invention with the pan removed.

Referring now to FIG. 2, ears 62 and 63 have aligned holes, not shown, formed therein for insertion of a retaining clip 66. Clip 66 has a generally linear portion 68 extending through the holes formed in ears 62 and 63. As shown in FIG. 2, clip 66 further includes a portion 70 which extends around ears 62 and 63 so that feed device 18 will remain securely locked to the overhead feed line.

Referring now to FIG. 4, each feed station includes a generally circular pan 74 and a top enclosure genreally designated by the number 76 which is configured for access of the animals to the interior of the pan. Pan 74 includes a bottom 78 and generally circular sidewall 80 which extends upwardly from the bottom. Bottom 78 includes a portion 82 which slopes downwardly from the bottom edge of the sidewall.

Pan 74 further includes a portion which slopes upwardly from portion 82. In the case of the first feed station, the upwardly sloping portion is in the form of generally frustoconical shaped portion 84 which slopes upwardly to a generally circular aperture 88 which is at approximately the center of bottom 78. Bottom 78 of the first feed station further includes a cylindrical outlet 90 which extends generally vertically and downwardly from aperture 88 into the interior of feed inlet 89 of the second feed conduit 53. Feed outlet 58 is positioned above aperture 88 so as to enable at least some of the animal feed to be retained within the pan of the first feed station.

In the case of the second feed station, the upwardly sloping portion is in the form of generally conical portion 91, the feed outlet 92 of the second feed conduit extending into the second feed station and being positioned above portion 91.

In order to position feed inlet 89 of the second feed conduit 53 in a fixed relationship beneath aperture 88, a connecting device indicated by numeral 93 is used to releasably secure feed inlet 89 about downwardly extending cylindrical outlet 90. Device 93 includes a bowed portion 94 having a lock pin 95 at one end thereof. Holes, not shown, are formed in downwardly extending cylindrical outlet 90 and the second feed conduit so that lock pin 95 can be inserted into the holes when they are aligned to secure the second feed conduit to the bottom of the pan of the first feed station. Thus, the second feed conduit can be disconnected from the first feed station for various purposes such as periodic cleaning.

Figure 3:
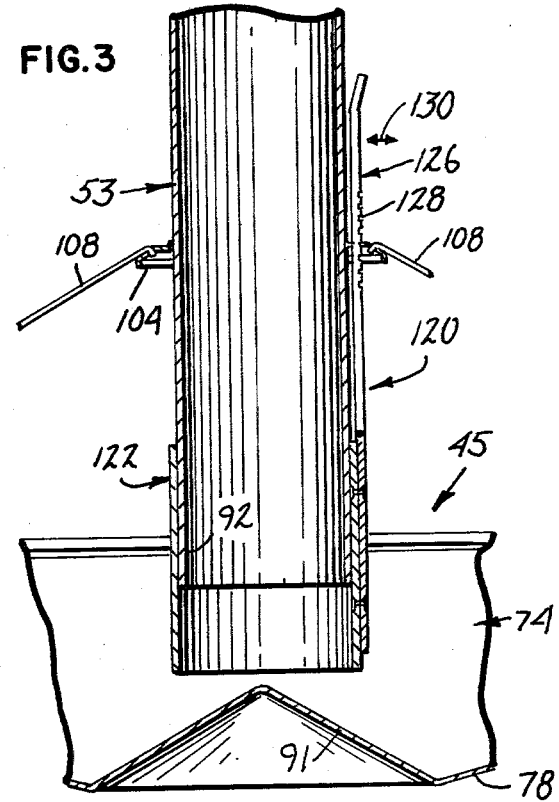
FIG. 3 is an enlarged view of a lower portion of FIG. 3 showing the feed quantity adjustment mechanism.

As shown in FIGS. 3 and 4, enclosure 76 includes annular member 104 of suitable shape and size. Member 104 has a number of radially spaced protrusions, not shown, which extend inwardly from the inner edge thereof so that the annular member surrounds and frictionally engages the exterior surface of the feed conduit so as to mount the feed station on the conduit. Enclosure 76 further includes a plurality of elongated members such as legs 108. One end of each of the legs is secured by suitable means to annular member 104, e.g., end of leg bent and secured within holes formed in annular member 104, such that the legs are radially spaced, preferably equally spaced, in a generally spider-like fashion with respect to the annular member. Each leg 108 has a portion 110 which extends generally outwardly and downwardly at an angle from annular member 104 and a portion 112 which extends generally vertically and downwardly from portion 110. Portion 112 terminates in a curved end 114 which is configured so as to fit underneath generally circular ring 100 and is secured thereto by welding.

Figure 5:
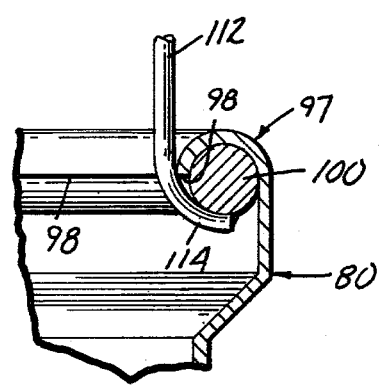
FIG. 5 is an enlarged fragmentary detailed view of a portion of FIG. 4.

Referring now to FIG. 5, sidewall 80 has a generally circular lip 97 formed from overturned edge 98 which curves inwardly to receive ring 100. As shown in FIG. 2, ring 100 has a portion 101 which is removed so that ring 100 can be forced beneath edge 98. Ring 100 is sufficiently resilient or springlike so that ring 100 expands to engage lip 97 and thus releasably secures top enclosure 76 to sidewall 80. Thus, the feed station can be disassembled for easy cleaning.

Referring now to FIG. 3, feed device 18 further includes a mechanism for adjusting the quantity of feed delivered to the feed station to prevent it from becoming stale which is generally indicated by numeral 120. As shown, particularly in FIG. 4, mechanism 120 is provided for each of the feed conduits. Mechanism 120 includes a generally cylindrical sleeve 122 which is slidably mounted on the outer surface of the feed conduit at its feed outlet end. Mechanism 120 further includes a height adjustment member, such as rod 126, which has one end secured to the outer surface of sleeve 122. Rod 126 has formed therein a plurality of spaced notches 128. Notches 128 are sized for insertion of the inner edge of annular member 104 so that sleeve 122 can be vertically adjusted with respect to the bottom of the pan. By moving rod 126 toward or away from the feed conduit, as indicated by double headed arrow 130, the inner edge of annular member 104 can be inserted into any one of the notches 128. By vertically adjusting the height of sleeve 122 above the bottom of the pan of the feed station, the quantity of feed supplied to the feed station can thus be controlled.

In operation, animal feed is supplied from the storage bin to the overhead feed line. The feed is moved along within the overhead feed line by the core auger. When the feed reaches the feed inlet of the first feed conduit, it falls downwardly through the first feed conduit, through the aperture in the bottom of the pan and then finally through the second feed conduit. The feed collects and piles up on the bottom of the pan of the second feed station as indicated by dotted lines 134 until it reaches the bottom of the sleeve mounted on the second feed conduit. The feed then accumulates in the second feed conduit until it overflows into the bottom of the pan of the first feed station. Once the feed level as indicated by dotted lines 136 in the first feed station reaches the bottom of the sleeve mounted on the first feed conduit, the feed accumulates further within the first feed conduit. Because moisture cannot get in, the feed accumulated within the feed conduits remains fresh.

If desired, the sleeve can be moved upwardly along the feed conduit so that more feed will flow into the bottom of the pan. Also, the feed accumulated in the feed conduits will move downwardly under the force of gravity to replenish the quantity of feed consumed by the animals.

While two feed stations are shown in the preferred embodiment, it should be understood that more than two feed stations could be utilized if desired, e.g., a third feed station connected to the second feed station by a third feed conduit.

Figure 6:
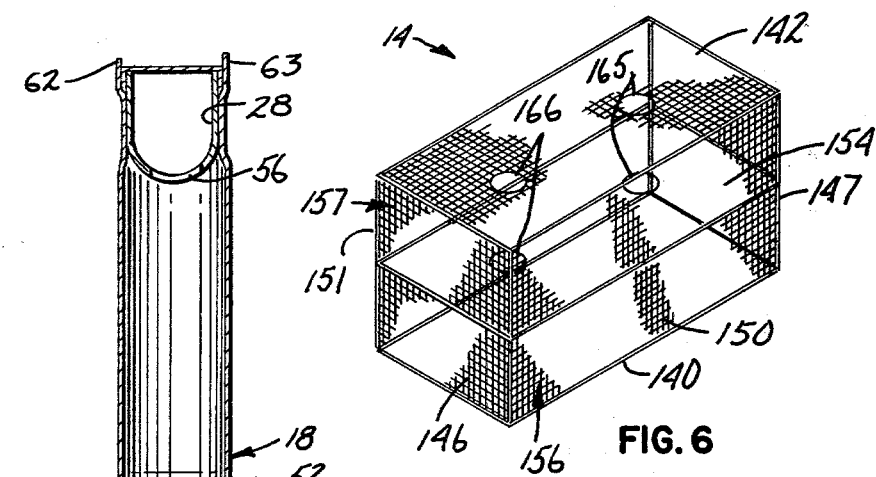
FIG. 6 is a diagrammatic view in perspective of a multi-tiered cage according to the present invention.

As shown in FIG. 6, cage 14 can be of a suitable shape, such as rectangular or box-like, and is configured so as to prevent escape of the animals from the cage. Cage 14 includes a generally planar floor 140 positioned below the second feed station and a generally planar ceiling 142 generally parallel to the floor and positioned above the first feed station. Cage 14 further includes a pair of opposite generally parallel spaced end walls 146 and 147 which extend generally vertically from each end of the floor to each end of the ceiling and a pair of opposite generally parallel spaced sidewalls 150 and 151 which extend generally vertically from each side edge of the floor to each side edge of the ceiling.

Cage 14 further comprises a partition 154 which is positioned below the first feed station and above the second feed station and is connected generally perpendicularly to the side and end walls and runs generally parallel to the floor and the ceiling of the cage. Partition 154 divides cage 14 into a pair of lower and upper tiers 156 and 157 of equal space so as to separate the animals.

As shown in FIG. 6, the floor, the ceiling, the end walls, the sidewalls and the partition are preferably formed of a meshwork of a first plurality of rods and a second plurality of rods extending generally perpendicularly across the first plurality of rods. The ceiling and the partition also have apertures 164 and 165 which are sized for insertion of the feed conduits. For the purposes of cleaning, assembling or disassembling, and removing or inserting the animals, the various parts of the cage, e.g., ceiling, sidewalls, etc., can be removable or pivotally mounted, e.g., hinged. Doors can also be provided instead of or in addition to the foregoing.

By providing cage 14 with partitions 154, the available raising area is economically and efficiently utilized. Furthermore, the raising of multiple breeds of animals can be accomplished in the minimum amount of space while at the same time keeping the various breeds separated where necessary. When desirable, more than one partition 154 can be utilized for creating additional tiers in cage 14.

I claim:

1. A multi-tiered feed device for animals, comprising:
   an upper first animal feed station;
   a lower second animal feed station spaced generally vertically from said first station, each of said stations including a pan having a bottom and a sidewall extending upwardly from said bottom, and a top enclosure secured to said sidewall and being configured for access of the animals to the interior of the pan;
   means for supplying feed to said feed stations, including a first discrete feed conduit having a feed inlet and a feed outlet extending into said first station and being positioned over and above an aperture in said bottom of said pan of said first station, said first station being mounted on said first conduit, and a second discrete feed conduit having a feed inlet positioned beneath said aperture and a feed outlet extending into said second station and above said bottom of said pan of said second station, said second station being mounted on said second conduit; and
   first suspension means for suspending said first station from said first conduit and second suspension means for suspending said second conduit from said first station.

2. A feed device according to claim 1 wherein said bottom of said first station has a portion sloping upwardly to said aperture.

3. A feed device according to claim 2 wherein said bottom of said second station has a portion of generally conical configuration positioned beneath said feed outlet of said second conduit.

4. A feed device according to claim 1 further comprising means for mounting said first conduit to an overhead feed line.

5. A feed device according to claim 4 wherein said feed inlet of said first conduit is configured for insertion onto the over head feed line and has a pair of spaced aligned holes formed therein above the feed line and wherein said mounting means comprises a retaining clip having a portion insertable through said holes.

6. A feed device according to claim 1 wherein said top enclosure of at least one of said stations comprises a generally annular member surrounding and frictionally engaging one of said conduits, a plurality of spaced elongated members connected at first ends to said annular member and extending generally radially outwardly and downwardly therefrom, and means connected to second ends of said elongated members for releasably securing said top enclosure to said sidewall of said pan.

7. A feed device according to claim 6 wherein said sidewall has a generally circular lip curved inwardly at a top edge thereof for receiving said securing means.

8. A feed device according to claim 7 wherein said securing means comprises a generally circular resilient ring having a portion removed so that said ring can be forced beneath said lip.

9. A feed device according to claim 1 further comprising means for adjusting the quantity of feed supplied to at least one of said feed stations.

10. A feed device according to claim 9 wherein said adjusting means comprises a sleeve slidably mounted on one of said conduits and being vertically adjustable with respect to said bottom of said pan of said at least one station.

11. A feed device according to claim 10 wherein said adjusting means further comprises a height adjustment member mounted on said sleeve and having a plurality of notches formed therein and wherein said top enclosure of said at least one station has a portion insertable within any of said notches.

12. A feed device according to claim 11 wherein said height adjustment member comprises an elongated rod having one end secured to said sleeve.

13. A feed device according to claim 1 wherein said second suspension means is disconnectable to readily attach and detach said second conduit from said first station.

14. A feed device according to claim 13 wherein said second suspension means includes a wall of the feed outlet from said first station, said wall extending generally vertically downward, a portion of the feed inlet to said second conduit and coupling means for releasably coupling said wall to said portion of the feed inlet to said second conduit.

15. A feed device according to claim 14 wherein said wall of the feed outlet from said first station is generally cylindrical, the portion of the feed inlet to said second conduit is generally cylindrical, said portion and said wall overlapping in their connected state, and said coupling means including a retaining clip for insertion into aligned holes in the overlapping area of said portion and wall.

16. A multi-tiered cage and feed device for animals, comprising:
    an upper first feed station;
    a lower second feed station spaced generally vertically from said first station, each of said stations including a pan having a bottom and a sidewall extending upwardly from said bottom, and a top enclosure secured to said sidewall and being configured for access of the animals to the interior of the pan;
    means for supplying animal feed to said stations including a first discrete conduit having a feed inlet and a feed outlet extending into said first station and being positioned over and above an aperture in said bottom of said pan of said first station, said first station being mounted on said first conduit, and a second discrete conduit having a feed inlet positioned beneath said aperture and a feed outlet extending into said second station, said second station being mounted on said second conduit;

first suspension means for suspending said first station from said first conduit, and second suspension means for suspending said second conduit from said first station;

a cage completely surrounding said stations and being configured to prevent escape of the animals therefrom; and means positioned below said first station and above said second feed station for dividing said cage into an upper and a lower tier.

17. A multi-tiered cage and feed device according to claim 16, wherein said cage further comprises a floor positioned below said second station, a ceiling positioned above said first station, and at least one sidewall connecting said floor to said ceiling.

18. A multi-tiered cage and feed device according to claim 17, wherein said at least one sidewall comprises a pair of opposite sidewalls, and wherein said dividing means comprises a partition connecting said sidewalls.

19. A multi-tiered cage and feed device according to claim 18 wherein said partition comprises a meshwork of a first plurality of rods and a second plurality of rods extending transversely with respect to said first plurality of rods.

20. A feed device according to claim 16 wherein said second suspension means is disconnectable to readily attach and detach said second conduit from said first station.

21. A feed device according to claim 20 wherein said second suspension means includes a wall of the feed outlet from said first station, said wall extending generally vertically downward, a portion of the feed inlet to said second conduit and coupling means for releasably coupling said wall to said portion of the feed inlet to said second conduit.

22. A feed device according to claim 21 wherein said wall of the feed outlet from said first station is generally cylindrical, the portion of the feed inlet to said second conduit is generally cylindrical, said portion and said wall overlapping in their connected state, and said coupling means including a retaining clip for insertion into aligned holes in the overlapping area of said portion and wall.

* * * * *

UNITED STATES PATENT AND TRADEMARK OFFICE
CERTIFICATE OF CORRECTION

PATENT NO. : 4,216,742
DATED : August 12, 1980
INVENTOR(S) : James E. Kirchhofer It is certified that error appears in the above-identified patent and that said Letters Patent are hereby corrected as shown below:

Column 2, line 22, "Figure 3" should be --Figure 2--;

Column 3, line 5, "genreally" should be --generally--;

Column 5, line 68, "over head" should be --overhead--.

Signed and Sealed this

Twenty-fifth Day of November 1980

[SEAL]

Attest:

SIDNEY A. DIAMOND

Attesting Officer     Commissioner of Patents and Trademarks